United States Patent [19]
Howlett et al.

[11] 3,850,535
[45] Nov. 26, 1974

[54] CONNECTING MEANS AND METHOD FOR FORMING REINFORCING ROD CONNECTION

[75] Inventors: George H. Howlett; James W. Howlett, both of Oakland, Calif.

[73] Assignee: Hewlett Machines Works, Berkeley, Calif.

[22] Filed: Sept. 11, 1972

[21] Appl. No.: 287,920

[52] U.S. Cl. .................. 403/305, 403/312, 403/333
[51] Int. Cl. ............................................. F16b 7/18
[58] Field of Search ........... 403/46, 47, 48, 43, 305, 403/306, 344, 405, 312, 332, 333; 285/332, 333

[56] References Cited
UNITED STATES PATENTS

| | | | |
|---|---|---|---|
| 620,814 | 3/1899 | Warren | 403/306 X |
| 786,516 | 4/1905 | Phelan | 285/333 X |
| 821,564 | 5/1906 | Wilks et al. | 403/306 X |
| 1,067,819 | 7/1913 | Kemp | 403/305 X |
| 1,223,512 | 4/1917 | Neville | 403/46 X |
| 1,406,229 | 2/1922 | Schneider | 403/312 |
| 1,951,220 | 3/1934 | Tarr | 403/312 |
| 2,135,812 | 11/1938 | Gray | 403/305 |
| 2,366,010 | 12/1944 | Dies | 285/332 |
| 2,867,680 | 1/1959 | Stecher | 403/306 X |
| 3,415,552 | 12/1968 | Howlett | 403/305 |

*Primary Examiner*—Werner H. Schroeder
*Attorney, Agent, or Firm*—Warren, Rubin & Chickering

[57] ABSTRACT

A mechanical connecting means and method for forming a reinforcing rod connection between aligned end-to-end metallic reinforcing rods formed with threaded convergently tapered connecting end sections is disclosed. The connecting means includes a pair of couplers mounted in threaded engagement with the connecting sections on the rods and coupler linking means formed to extend between the couplers and formed for releasable securement to both of the couplers solely by manipulation of the linking means. The connecting means enables the formation of a high strength connection in situations in which the reinforcing rods themselves cannot be rotated. The linking means is preferably formed as a sleeve having a cylindrical threaded bore which mates with threads on the external surface of the couplers to enable the couplers to be pulled together with a positive securement force by rotating the sleeve. Other structures for linking the couplers together are disclosed including a split sleeve.

6 Claims, 5 Drawing Figures

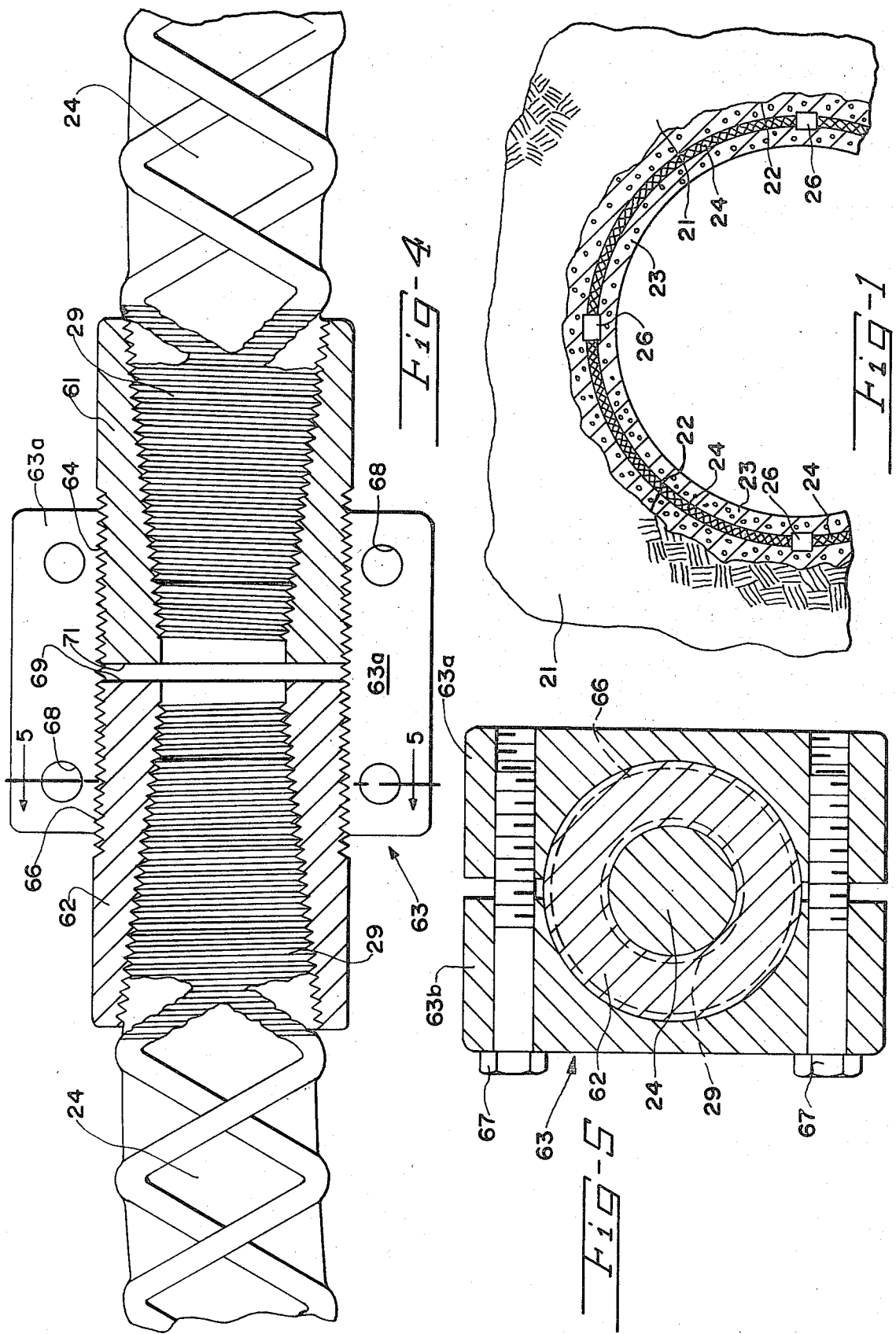

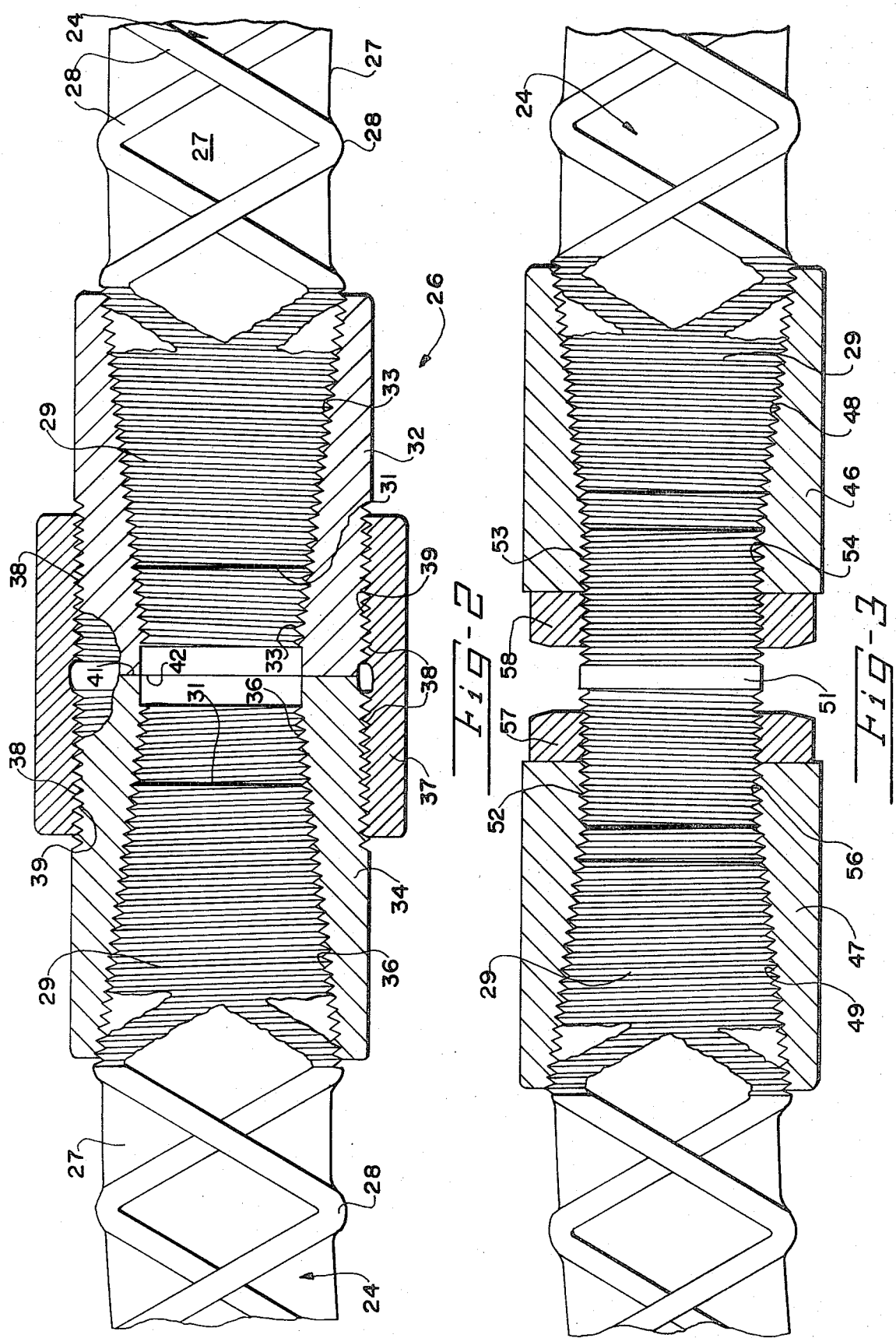

CONNECTING MEANS AND METHOD FOR FORMING REINFORCING ROD CONNECTION

BACKGROUND OF THE INVENTION

The reinforcement of concrete structures with metallic reinforcing rods, sometimes called "rebar," is quite commonplace today. In many situations, structures are formed in which reinforcing rods must be joined or connected in aligned end-to-end relation by a connecting means which will effectively transfer the high compression and tension loads which the reinforcing rods experience from one rod to another. A variety of coupling techniques for joining rebar members have been evolved, including, gas or arc welding, thermite welding, thermite formation of mechanical matrixes, and purely mechanical couplers. While welding would theoretically produce a connection between the rebar having a strength at least as great or greater than the bar itself, under actual field conditions, welded joints often fall far below the strength of the reinforcing rod. Similarly, the use of pyrotechnics such as thermite to form a matrix of metal, such as copper, in a crucible around the rebar members has been found to have substantial disadvantages. The coupling may exhibit a slip characteristic during loading, the pyrotechnic can cause a fire hazard to the concrete forms and a safety hazard to workers, and the use of pyrotechnics may be impaired by humid conditions.

At least two types of mechanical couplers have been evolved as a substitute for the welded connection. One approach has been to form a cylindrical surface on the end of the rod by removing the ribs on the rebar and then threading the resulting surface. The threaded rebar is then joined by a connecting sleeve which is internally threaded. The disadvantage of this mechanical coupling is that the rebar must be reduced in diameter at the coupling section, often a very substantial reduction, to eliminate the ribs, which results in a loss in strength of the connection. A second approach to mechanical coupling is set forth in U.S. Pat. No. 3,415,552 in which a threaded tapered connecting section is formed at the end of the rebar. Since the connecting section tapers, the threads initially extend into the ribs of the rebar and, as the section converges, into the central body of the rebar to pick up the full strength of the rebar when joined by a sleeve having oppositely facing, mating, tapered and threaded internal bores. A high strength mechanical connection with the tapered rebar connection of U.S. Pat. No. 3,415,552 can, however, only be repetitively achieved if at least one of the rebar members in addition to the coupling sleeve is free to be rotated to take all of the slack out of the connection.

One example typical of a situation in which the reinforcing rods cannot be rotated is the formation of a tunnel in which curved reinforcing rods are used to reinforce a concrete shell inside the tunnel. When cylindrical threads are formed on each end of the curved reinforcing rods and a cylindrical sleeve is used, the sleeve may be rotated to pull the ends of the rebar into abutment without the necessity of rotating either of the curved reinforcing rods. This connection, however, will have a reduced strength by reason of the reduced diameter of the cylindrical threaded ends of the reinforcing rods. When the device of U.S. Pat. No. 3,415,552 is employed having tapered connecting sections on the rebar, it is not possible to effect a high strength connection simply by rotating the coupling sleeve. Since the connecting sections and the coupling sleeve are both tapered, the connection is made by rotating the sleeve only a few turns, for example, four to five rotations of the sleeve will achieve full connection. Unless the threads on each of the ends of the rebar and on each of the ends of the sleeves are in perfect alignment, however, rotation of the tapered rebar coupler sleeve will result in the coupler being rotated to a position which effects complete connection with one of the reinforcing rods before full connection is reached with the other rod. This condition is not tolerable since there is slack between the threads on the coupling sleeve and the tapered threads on the rebar, which will cause slippage at the connection upon loading of the concrete structure.

Accordingly, it is an object of the present invention to provide a reinforcing rod connection and method of effecting the same which can be employed to achieve a substantially full strength connection between reinforcing rods when the rods cannot be manipulated or rotated to facilitate the mechanical connection.

Another object of the present invention is to provide a reinforcing rod connection and method of effecting the same which is economical, durable and easy to employ under field conditions.

Other objects and features of advantage of the reinforcing rod connection and method of the present invention will become apparent from the drawings and from the more detailed description set forth hereinafter.

SUMMARY OF THE INVENTION

The improved reinforcing rod connecting means for joining a pair of metallic reinforcing rods having threaded convergently tapered connecting sections is comprised, briefly, of first and second couplers formed for and mounted in mating threaded engagement on tapered threaded connection sections on the ends of aligned reinforcing rods, and coupler linking means formed to extend between the couplers and formed for releasable securement to both couplers solely by manipulation of the linking means. The linking means between the couplers is preferably a sleeve having a cylindrical bore with internal threads which mate with cylindrical threads of opposite hand formed on the exterior surface of both couplers. Alternatively, an externally threaded bar having cylindrical ends may be used as the linking means when the couplers are formed with juxtaposed cylindrical threaded bores. Still alternatively, a split sleeve having internal grooves, such as may be provided by threads, which mate with grooves or protrusions on the couplers may be employed as a linking means.

DESCRIPTION OF THE DRAWINGS

FIG. 1 is a fragmentary, end elevational view in cross-section of a tunnel having a concrete wall with reinforcing rods mounted therein and including mechanical reinforcing rod connecting means.

FIG. 2 is an enlarged, side elevational view, partially in cross-section, of a reinforcing rod connection constructed in accordance with the present invention.

FIG. 3 is an enlarged, side elevational view, partially in cross-section, of an alternative embodiment of a reinforcing rod connection constructed in accordance with the present invention.

FIG. 4 is an enlarged, side elevational view, partially in cross-section, of still a further alternative embodiment of the reinforcing rod connection constructed in accordance with the present invention.

FIG. 5 is an end view, in cross-section and taken along the plane of line 5—5 in FIG. 4.

DESCRIPTION OF THE PREFERRED EMBODIMENTS

The installation and use of reinforcing rods in concrete support structures and tunnels is particularly illustrative of the advantages of the reinforcing rod connection of the present invention. Referring to FIG. 1, there is illustrated a tunnel which has been formed in earth matter 21 by drilling, blasting and conventional tunnel forming techniques to provide an irregular tunnel wall 22. While the tunnel is still being constructed, it is preferred practice to form a concrete shell or structure 23 inside tunnel surface 22. Mounted within concrete shell 23 periodically along the length of the concrete shell are reinforcing rods or bars 24. Since it is usually not possible to form the reinforcing rods 24 as one single continuous bar or rod, connection means 26 are provided to connect the rods in end-to-end relation within the concrete shell. Reinforcing rods 24 and connection means 26 are positioned inside forms prior to forming the concrete shell in a conventional manner, and the tunnel shell may further include radially extending anchors or rock-bolts for further support and reinforcement of the tunnel.

As will be seen in FIG. 1, rebar members 24 cannot be rotated about their longitudinal axes because the curvature thereof would cause them to strike tunnel wall 22. Therefore, there is only one orientation which the rebar members 24 can assume, and coupling means 26 must be constructed in a manner allowing the formation of a high strength joint between the aligned rebar members without the need of manipulating the reinforcing rods to effect formation of the joint or connection. A welded connection could be used, but gases and/or dust in the tunnel may create a hazard. Still further, as will be evidenced in FIG. 1, welding the rebar members 24 can be quite difficult in a tunnel configuration because of the inability to get adequate access to the side of the rebar adjacent tunnel wall 22. Pyrotechnically formed matrixes could be quite hazardous to the workers, as well as being very time consuming and producing a connection which may slip to some degree under loading. The mechanical coupling of rebar for use in the construction of tunnels and the like is, therefore, highly advantageous, if a high strength connection can be rapidly and easily effected.

In order to take advantage of the high strength characteristics of the reinforcing connection of U.S. Pat. No. 3,415,552, an improved connecting means has been developed for use in applications in which the rebar cannot be rotated. As will be seen in FIG. 2, rebar members 24 are mounted in aligned end-to-end relation and each of the rebar members or reinforcing rods is formed with a central body portion 27 from which ribs 28 protrude. Formed on the juxtaposed ends of rebar members 24 are convergently tapered connecting sections 29 which have tapered threads extending initially into ribs 28 and, adjacent ends 31 of members 24, the threads extend into the central body 27 of the rebar members. The threaded tapered connecting sections on the rebar are the same as set forth in U.S. Pat. No. 3,415,552 and have the advantage of enabling the mechanical connecting means to pick up the full strength of the reinforcing rod by gripping even ribs 28 as well as the body of the rebar members.

In order to enable joining of members 24 in a high strength joint without the need of rotating or otherwise manipulating the members themselves, connecting means 26 is formed as a first coupler 32 having a tapered threaded bore 33 formed for and mounted in mating threaded engagement with connecting section 29 on a first of rebar members 24. The connecting means further includes a second coupler 34 having a tapered threaded bore 36 formed for and mounted in threaded engagement on connecting section 29 of the remaining rebar member. Additionally, coupler linking means, here shown as sleeve 37, if formed to extend between couplers 32 and 34 and is formed for releasable securement to both of the couplers solely by manipulation of linking means or sleeve 37. Instead of forming couplers 32 and 34 as a single member, as shown in U.S. Pat. No. 3,415,522, each of couplers 32 and 34 may be manipulated independently of the other coupler. Thus, coupler 32 may be threaded on one connecting section and cinched down until substantially all of the slack between the threaded bore 33 and threads on connecting section 29 is removed. Next, coupler 34 can be threaded onto the end of the remaining rebar member 24 and rotated independently of coupler 32 until it is cinched down and substantially all of the slack between the threads 36 of the coupler and the threads on connecting section 29 has been removed. Both of these operations can be accomplished without the need for rotating either of rebar members 24 and will produce a high strength securement of the couplers to the rebar members.

As shown in FIG. 2, it is preferable that the exterior surfaces adjacent the ends of the couplers 32 and 34 be cylindrical in configuration and formed with threads 38, with connecting means or sleeve 37 being formed with mating internal threads 39. If the threads 38 on coupler 32 and the threads 38 on coupler 34 are of opposite hand, that is, one coupler is formed with right-handed threads and the other formed with left-handed threads, and sleeve 37 has correspondingly formed threads of opposite hand 39, rotation of sleeve 37 into threaded engagement with couplers 32 and 34 will cause the couplers to be drawn toward each other until ends 41 and 42 are in abutment. Once ends 41 and 42 abut each other, further rotation of sleeve 37 will apply a positive force between the linking sleeve and the couplers to remove substantially all the slack between the linking means and the couplers to form a high strength, slack-free connection.

Unlike tapered threads, it is not necessary, when a cylindrical threaded surface is employed, that the beginning of the thread at each end of the sleeve and the beginning of the thread on the couplers all be aligned. Angular variances between the position at which these threads start may result in one of the two couplers being axially advanced a slight distance farther than the other into sleeve 37, but at some point ends 41 and 42 will come into abutment. When this occurs, all of the slack between the threaded sleeve and the exterior of the couplers is removed so that the joint or connection will not slip under load conditions. Instead of threading both couplers, a shoulder mating with a shoulder in sleeve 37 could be formed on the exterior of one of the couplers.

It is an additional feature of the connection means of the present invention to form the threads on the tapered bore of the coupler and on the exterior surface of the same hand. As shown in FIG. 2, threads 33 and 38 on coupler 32 are both left-handed threads, that is, rotation of the sleeve 37 and coupler 32 in a counterclockwise direction will cause an advancement of the sleeve onto coupler 32 and coupler onto connecting section 29. Similarly, threads 36 and 38 on coupler 34 are both right-handed threads with rotation in a clockwise direction, as viewed from end 41, causing the sleeve to be advanced.

When the threads in the tapered bore of the coupler and those on the exterior surface are the same hand cinching down on the threaded sleeve 37 tends to cause the couplers to cinch down further on the threaded sections 29 of the rebar members, rather than become loosened.

An alternative embodiment of the connection means of the present invention is shown in FIG. 3. As will be seen, couplers 46 and 47 are provided with frusto-conical threaded bores 48 and 49 formed to mate with threaded connection sections 29 on rebar members 24. Instead of providing the couplers with threaded exterior surfaces and a sleeve-type linking means, the linking means of FIG. 3 is in the form of an elongated bar member 51 having opposite cylindrical externally threaded ends 52 and 53 formed for and mounted in mating threaded engagement with cylindrical juxtaposed threaded bores 54 and 56 in the ends of the couplers. Additionally, the linking means is preferably provided with locking nuts 57 and 58 mounted in threaded engagement on member 51 at a spaced distance from the distal end thereof and abutting the ends of the couplers to allow removal of all slack between the couplers and the linking means.

The reinforcing rod connection of FIG. 3 is achieved by threading the couplers 46 and 47 down to a tight position on the connection sections 29, threading member 51 into bores 54 and 56 with the locking nuts already mounted on member 51, and cinching down the locking nuts. Again, this form of linking or coupling means allows members 24 to be joined without the need of rotating either of the members and while still taking advantage of the high strength achievable by means of using the tapered connection sections on the ends of the rebar members.

A further alternative embodiment of the reinforcing rod connection of the present invention is shown in FIGS. 4 and 5. Couplers 61 and 62 are formed in substantially the same manner as couplers 32 and 34 of FIG. 2. Instead of using a linking means which is rotated to effect a high strength securement between the couplers, the linking means of the device of FIGS. 4 and 5 is formed as a split sleeve 63a and 63b demountably positioned around threaded end portions 64 and 66 of the couplers. Coupler linking means 63a and 63b further includes convergent actuating means in the form of bolts 67 mounted in openings 68 and threadably engaging split sleeve 63b for clamping both sleeves to the couplers.

In order to provide a high strength reinforcing rod connection which does not slip or creep under loading, split sleeve 63 and end portions 64 and 66 must be formed so that the convergent movement of the split sleeve also results in the couplers being secured in a manner preventing axial slippage between the linking split sleeve and the couplers. A split sleeve having a smooth surface and gripping a smooth exterior on the couplers, for example, would require entremely high radial gripping forces to attempt to insure that the couplers would not slip axially toward or away from each other when loaded. Even if the split sleeve and couplers had radially projecting interlocking shoulders, the axial dimensions would have to be perfect to prevent slippage. Accordingly, the split sleeve or couplers of the present invention are formed with a recess having a surface inclined to a radially projecting plane (perpendicular to the longitudinal axis of the connection) with the other of the sleeve and coupler having a protrusion which mates with the inclined surface of the recess. As shown in FIGS. 4 and 5, threads are employed as the recesses and protrusions, with the surfaces defining the threads inclined to remove axial slack. Upon cinching the split sleeve down radially by bolts 67, threads in the split sleeve mate with threads in the couplers, which in turn seat by moving the couplers axially until substantially all of the slack in the axial direction is removed. Since there is no rotation required of split sleeve 63a–b to effect coupling, the threads in the split sleeve and on the exterior surface of the couplers may be circular grooves, as opposed to a continuous running spiral thread. Similarly, a single recess could be formed in the outside of couplers 61 and 62 having a V-shaped cross-section with mating protrusions projecting from split sleeve 63. As will be seen in FIG. 4, ends 69 and 71 of couplers 61 and 62 do not abut each other, and such abutment is not required in order to produce the high strength, slack-free connection.

In each of the alternative forms of the reinforcing rod connection of the present invention the method for forming the connection includes threading the couplers on the reinforcing rod at the connecting sections thereof and applying a substantial positive rotational force to cinch the couplers to the rod and substantially remove the slack and the chance for slippage therebetween. With each of the couplers firmly secured to the ends of the reinforcing rods, a linking means formed to link the two couplers together solely by manipulating the linking means is employed. The linking means must be further formed to allow a positive securement force to be created between the linking means and each of the couplers, again without manipulating the reinforcing rods, so that the overall connection has a strength approaching or exceeding that of the reinforcing rods themselves.

The coupling means for use in forming the reinforcing rod connection of the present invention can be formed of conventional high strength steels. The dimensions of the couplers in the linking means should take into consideration the strength of the rebar members to be connected. It is possible by means of selection of the materials employed to vary the dimensions substantially while still maintaining a connection having the same strength as the reinforcing rod members. It should be noted in connection with the connecting means of FIG. 3 that linking means 51 has a diameter less than that of reinforcing rods 24 and accordingly should be made of a higher strength material than the reinforcing rods.

We claim:

1. In a high strength, slack-free, reinforcing rod connection including a pair of metallic reinforcing rods mounted in aligned end-to-end relation and connecting means mounted on and connecting said rods, said rods each being formed with a threaded convergently tapered connecting section at the juxtaposed ends thereof, the improvement of said connecting means comprising:
   a. a first coupler having a tapered threaded bore therein formed for and mounted in mating threaded engagement with the connecting section on a first of said rods, said first coupler being threaded onto said connecting section to a position removing all slack in an axial direction between said first coupler and said first of said rods;
   b. a second coupler having a tapered threaded bore therein formed for and mounted in mating threaded engagement with the connecting section on a second of said rods, said second coupler being threaded onto said connecting section to a position removing all slack in an axial direction between said second coupler and said second of said rods; and
   c. coupler linking means formed to extend between said first coupler and said second coupler and formed for releasable securement thereto solely by manipulation of said linking means, said linking means and said first coupler and said second coupler being adapted for removal of all of the slack in an axial direction between said linking means and said first coupler and said linking means and said second coupler during securement of said linking means thereto, and said linking means being mounted in secured relation to both said first coupler and said second coupler to provide a high strength slack-free connection.

2. The connecting means as defined in claim 1 wherein,
   said first coupler is formed with a cylindrical threaded exterior surface and said second coupler is formed with a cylindrical threaded exterior surface having threads of opposite hand than the surface on said first coupler; and
   said coupler linking means is formed as a sleeve having an internal cylindrical bore having threads formed for and mounted in mating engagement with said cylindrical threaded exterior surfaces on said first coupler and said second coupler, said tapered threaded bore in each of said first coupler and said second coupler is of the same hand as the said cylindrical threaded exterior surface on the respective ones of said first coupler and said second coupler.

3. The connecting means as defined in claim 1 wherein,
   said first and second couplers are each additionally formed with cylindrical juxtaposed threaded bores; and
   said coupler linking means includes: an elongated member having opposite cylindrical externally threaded ends formed for and mounted in mating engagement with said cylindrical juxtaposed threaded bores in said couplers, and means formed to remove slack in an axial direction between said member and said first coupler and said second coupler.

4. The connecting means as defined in claim 1 wherein,
   said coupler linking means is formed as a split sleeve demountably positioned around an end portion of each of said couplers and said coupler linking means includes convergent actuating means for clamping said split sleeve to said couplers;
   one of said first coupler end portions and said split sleeve surrounding said first coupler is formed with a recess having a surface therein inclined to a plane perpendicular to the longitudinal axis of said connection and the remainder of said first coupler end portions and said split sleeve is formed with a protrusion mating and mounted in engagement with said surface in said recess, said first coupler end portion and said split sleeve being dimensioned for relative interengagement of said mating protrusion and recess to a degree causing the removal of slack in an axial direction upon clamping of said split sleeve to said first coupler end portion; and
   one of said second coupler end portions and said split sleeve surrounding said second coupler is formed with a recess having a surface therein inclined to a plane perpendicular to the longitudinal axis of said connection and the remainder of said second coupler end portion and said split sleeve is formed with a protrusion mating and mounted in engagement with said second named recess, said second coupler end portion and said split sleeve being dimensioned for relative interengagement of said mating protrusion and recess to a degree causing the removal of slack in an axial direction upon clamping of said split sleeve to said second coupler end portion.

5. The connecting means as defined in claim 4 wherein,
   said recesses and protrusions in said first and second coupler end portions and said split sleeve are provided by threads formed in the exterior surface of said first and second coupler end portions and mating threads formed in an internal surface of said split sleeve.

6. In a rebar connection including a pair of rebar members mounted in aligned end-to-end relation and connecting means mounted and connecting said rebar members, said rebar members each being formed with a central body and ribs protruding outwardly from said body and each being formed with a threaded convergently tapered connecting section at the ends thereof with the threads of said section extending into said ribs and adjacent said ends into said central body, the improvement of connecting means, for use when said rebar members are formed and mounted to prevent rotation about the longitudinal axes thereof, comprising:

a. a first coupler having a tapered threaded bore therein formed for threading on a first of said rebar members at said section and threaded onto said section to a position substantially removing the slack between said threaded bore and said threaded section;
   b. a second coupler having a tapered threaded bore therein formed for threading on a second of said rebar members at said section and threaded onto said section to a position substantially removing the slack between said threaded bore and said threaded section; and
   c. coupler linking means formed for releasable securement to both said first and said second couplers solely by manipulation of said linking means and mounted to said first and said second couplers in a position substantially removing the slack between said linking means and each of said couplers.

* * * * *